(12) United States Patent
Schlegel et al.

(10) Patent No.: US 11,459,022 B2
(45) Date of Patent: Oct. 4, 2022

(54) ROLLING BEARING FOR THE MOUNTING OF A DRIVE WORM OF AN ELECTROMECHANICAL POWER STEERING SYSTEM OF A MOTOR VEHICLE

(71) Applicants: THYSSENKRUPP PRESTA AG, Eschen (LI); thyssenkrupp AG, Essen (DE)

(72) Inventors: Ulrich Schlegel, Maienfeld (CH); Michael Dona, Ludesch (AT)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 810 days.

(21) Appl. No.: 16/325,131

(22) PCT Filed: Aug. 10, 2017

(86) PCT No.: PCT/EP2017/070278
§ 371 (c)(1),
(2) Date: Feb. 12, 2019

(87) PCT Pub. No.: WO2018/033459
PCT Pub. Date: Feb. 22, 2018

(65) Prior Publication Data
US 2021/0300462 A1 Sep. 30, 2021

(30) Foreign Application Priority Data

Aug. 16, 2016 (DE) .................... 10 2016 115 147.5

(51) Int. Cl.
*F16C 19/16* (2006.01)
*B62D 5/04* (2006.01)
(Continued)

(52) U.S. Cl.
CPC ............ *B62D 5/0454* (2013.01); *F16C 19/16* (2013.01); *F16C 33/585* (2013.01);
(Continued)

(58) Field of Classification Search
CPC ....... F16C 33/583; F16C 33/585; F16C 19/16
See application file for complete search history.

(56) References Cited

U.S. PATENT DOCUMENTS 1,301,295 A * 4/1919 Mossig ................... F16C 43/06
384/507
3,370,899 A * 2/1968 Eklund ................... F16C 19/06
384/516
(Continued)

FOREIGN PATENT DOCUMENTS

CN 103649472 A 3/2014
CN 105377505 A 3/2016
(Continued)

OTHER PUBLICATIONS

English Translation of International Search Report issued in PCT/EP2017/070278, dated Nov. 3, 2017.

*Primary Examiner* — William C Joyce
(74) *Attorney, Agent, or Firm* — thyssenkrupp North America, LLC

(57) ABSTRACT

A rolling bearing for mounting a driving worm of a power-assisted steering system of a vehicle includes a rotatable inner ring and a rotationally fixed outer ring. Rolling elements arranged between the inner and outer ring are guided by a channel-shaped first raceway arranged on a radially outer side of the inner ring and by a channel-shaped second raceway arranged on a radially inner side of the outer ring. The second raceway includes a cross-sectional profile that varies around its circumference. The cross-sectional profile allows laterally offset rolling elements to roll and thus tilting of the inner ring about a tilting axis orthogonal to the axis of rotation of the rolling bearing if the tilting axis assumes a predetermined tilted position in the circumferential direction of the second raceway and limits tilting of the inner ring to a minimum when the tilting axis is angled 90° to the tilted position.

17 Claims, 3 Drawing Sheets

(51) Int. Cl.
*F16C 33/58* (2006.01)
*F16C 35/077* (2006.01)

(52) U.S. Cl.
CPC ........ *F16C 35/077* (2013.01); *F16C 2326/24* (2013.01); *F16C 2361/61* (2013.01); *F16C 2380/27* (2013.01)

(56) References Cited

U.S. PATENT DOCUMENTS

| | | | | |
|---|---|---|---|---|
| 4,343,521 | A | * | 8/1982 | Akabane .................. F16C 19/06 384/450 |
| 4,429,925 | A | * | 2/1984 | Orain .................... F16C 19/163 384/508 |
| 5,782,563 | A | * | 7/1998 | Muto ................. G11B 19/2009 384/450 |
| 6,371,653 | B2 | * | 4/2002 | Yajima .................... F16C 19/06 384/490 |
| 8,100,587 | B2 | * | 1/2012 | Morton ................. F16C 35/067 384/569 |
| 2006/0117883 | A1 | | 6/2006 | Yasuda |
| 2010/0175503 | A1 | | 7/2010 | Zhang |

FOREIGN PATENT DOCUMENTS

| | | | |
|---|---|---|---|
| DE | 23 45 866 A | | 3/1975 |
| DE | 94 21 787 U | | 10/1996 |
| DE | 198 54 277 C | | 5/2000 |
| DE | 10 2005 025 311 | * | 12/2006 |
| DE | 10 2006 039 740 A | | 2/2008 |
| DE | 10 2014 105 921 A | | 10/2015 |
| EP | 2 450 262 A | | 5/2012 |
| WO | WO 2013 11 0575 | * | 8/2013 |

* cited by examiner

Section A-A

Section B-B

Section C-C

Section D-D

ROLLING BEARING FOR THE MOUNTING OF A DRIVE WORM OF AN ELECTROMECHANICAL POWER STEERING SYSTEM OF A MOTOR VEHICLE

CROSS REFERENCE TO RELATED APPLICATIONS

This application is a U.S. National Stage Entry of International Patent Application Serial Number PCT/EP2017/070278, filed Aug. 10, 2017, which claims priority to German Patent Application No. DE 10 2016 115 147.5, filed Aug. 16, 2016, the entire contents of both of which are incorporated herein by reference.

FIELD

The present disclosure generally relates to a rolling bearing for mounting a driving worm of an electromechanical power-assisted steering system of a motor vehicle.

BACKGROUND

A rolling bearing is known for example from DE 10 2006 039 740 A1. In worm gears, the driving worm can be tilted or bent on account of the acting forces in the event of load. In order to avoid forced states, it is necessary to allow a certain tilting of the rolling bearing of the driving worm. Furthermore, tilting can be used for compensation for play, wherein such play can result from the engagement behavior of the worm gear on account of temperature effects and wear. This is allowed in the prior art in that one raceway of the bearing rings comprises a specific osculation and increased bearing play, which allows tilting of the inner ring with respect to the outer ring. A drawback of this solution is that it results in unfavorable engagement ratios between the driving worm and worm wheel, since the tilting is allowed in many different directions.

Thus a need exists for a rolling bearing which allows an improved engagement behavior between the driving worm and worm wheel.

DETAILED DESCRIPTION

Figure 1:
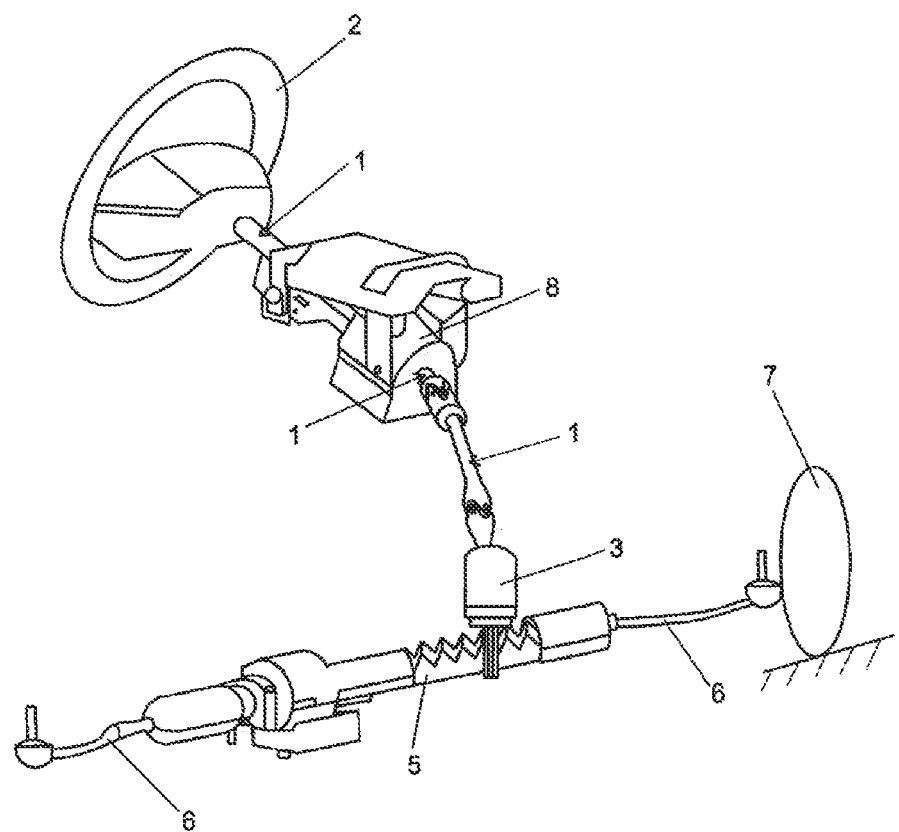
FIG. 1 is a schematic three-dimensional view of a steering system of a motor vehicle.
Figure 2:
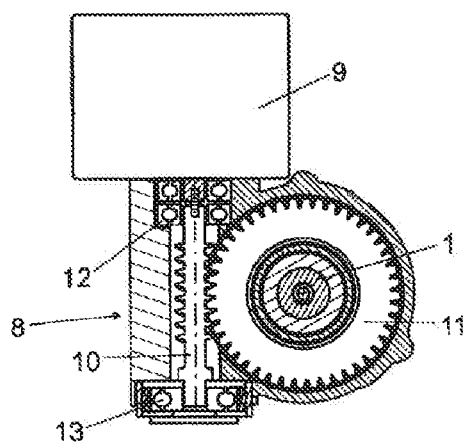
FIG. 2 is a cross-sectional schematic view of a worm drive having a rolling bearing for the driving worm.
Figure 3:
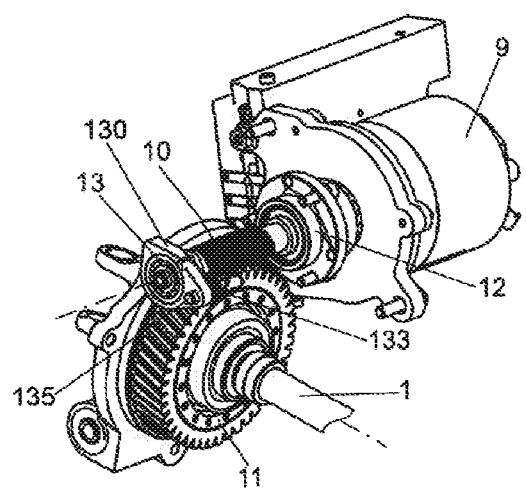
FIG. 3 is a three-dimensional view of the worm drive without a housing as per FIG. 2.
Figure 4:
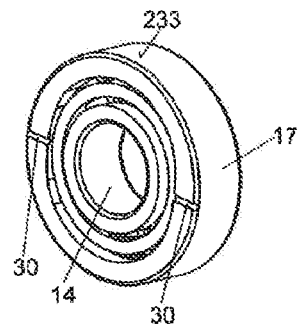
FIG. 4 is a perspective view of a rolling bearing according to the present disclosure.
Figure 5:
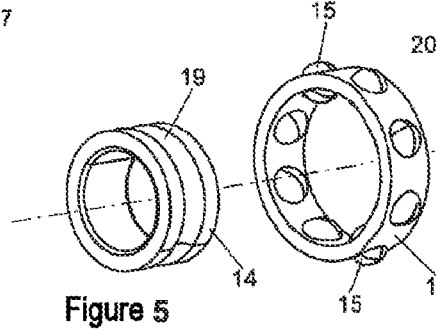
FIG. 5 is an exploded view of the rolling bearing in FIG. 4.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The invention relates to a rolling bearing for mounting a driving worm of an electromechanical power-assisted steering system of a motor vehicle, having an inner ring, an outer ring, and rolling elements which are arranged between the inner ring and outer ring and are guided by a channel-shaped first raceway arranged on the radially outer side of the inner ring and by a channel-shaped second raceway arranged on the radially inner side of the outer ring.

Since the second raceway comprises a cross-sectional profile that varies around its circumference, the rolling of laterally offset rolling elements and thus tilting of the inner ring about a tilting axis orthogonal to the axis of rotation of the rolling bearing is allowed if the tilting axis takes up a predetermined tilted position in the circumferential direction of the second raceway, and which prevents tilting of the inner ring to a minimum when the tilting axis is oriented at an angle of 90° to the tilted position. In this way, the inner ring can tilt in a predetermined direction in order to allow tilting or bending of the driving worm under load, without forced states arising. Moreover, the rolling bearing according to the invention prevents any tilting of the inner ring transversely to said tilting direction, with the result that unfavorable engagement conditions between the driving worm and worm wheel are avoided.

In a preferred embodiment of the invention, the cross-sectional profile varies sinusoidally around the circumference of the second raceway. This results in a maximum tilt angle of the inner ring when the tilting axis is oriented in the tilted position and a minimum tilt angle when the tilting axis is oriented at an angle of 90° to the tilted position. The sinusoidal configuration of the raceway variation thus ensures a smooth transition between a minimum possible tilt angle and a maximum tilt angle.

In a first configuration variant of the invention, the variation in the cross-sectional profile is realized in that a lateral extent of an osculation of the second raceway is varied around the circumference.

In an alternative configuration of the invention, the variation in the cross-sectional profile is realized in that the radial extent of the lateral flanks of the second raceway is varied around the circumference.

The osculation is determined from the quotient between the raceway radius and ball diameter.

Preferably, the radial extent comprises two minimum values and two maximum values, wherein the two minimum values of the extent are diametrically opposite one another and the two maximum values of the extent are diametrically opposite one another, wherein the extent with the minimum value is offset through 90° in the circumferential direction with respect to the extent with the maximum value. Thus, the values of the radial extent are alternately at a minimum and at a maximum around the circumference.

Preferably, the minimum value of the extent is 0.5 to 0.9 times the maximum value of the extent, particularly preferably 0.7 to 0.8 times.

It is likewise conceivable and possible for the variation in the cross-sectional profile of the second raceway to be realized in that the radial extent of the lateral flanks of the second raceway and the osculation of the second raceway are varied around the circumference. As a result, it is possible for the advantages of the varying osculation and the varying extent of the lateral flanks to be able to be used.

In an advantageous development, provision may be made for the rolling element to be in the form of a ball. Ball bearings are particularly suitable for the variation both in the osculation and in the radial extent of the lateral flanks of the second raceway.

In a further advantageous development, provision may be made for the rolling element to be guided in a cage. Preferably, the rolling bearing includes a plurality of rolling elements which are guided by the cage and are kept spaced apart from one another.

The orientation of the rolling bearing according to the invention upon installation in the desired position in the circumferential direction of the outer ring is rendered easier by the measure whereby the outer ring is provided with a marking of a circumferential position, which indicates the orientation of the tilted position of the tilting axis.

In a development of the abovementioned embodiment, provision is made for the marking to be configured as a protrusion or indentation in the material of the outer ring. This measure is particularly easy to realize, and the marking thus created is particularly durable. However, it is also possible to apply a colored marking to the outer ring.

Preferably, the inner ring and/or the outer ring is made of rolling bearing steel, particularly preferably of 100Cr6.

FIG. 1 shows a steering wheel 2, which is fastened at one end to a multipart steering shaft 1. The steering shaft 1 is connected at its lower end to a steering gear 3. A pinion 4 of the steering gear 3 cooperates with a rack 5, such that, when the steering wheel 2 is rotated, this results in a lateral linear displacement of the rack 5, such that the rotational movement of the steering shaft 1 is converted into a movement of the rack 5 in translation. The rack 5 is connected at both ends via track rods 6 to the steered vehicle wheels 7, which are pivotable by means of the track rods 6. Accommodated in a housing 8 is an electromechanical power steering system. The latter comprises a driving worm 10 which is driven by an electric motor 9 and cooperates with a worm wheel 11, which is fitted on the steering shaft 1. The driving worm 10 is mounted in the housing 8 by means of two ball bearings 12, 13. The ball bearing 13 is received in a pivotable rocker 130 preloaded by a spring 133, wherein the rocker 130 is held in the housing 8 so as to be rotatable about a rocker axis 135. The ball bearing 13 and the rocker 130 mount the driving worm 10 on the side facing away from the electric motor 9, wherein the ball bearing 12 mounts the driving worm 10 on the side facing the electric motor 9.

In an embodiment that is not shown, provision may likewise be made for the ball bearing 13 and the rocker 130 to be arranged on the side facing the electric motor 9 and for the ball bearing 12 to be arranged on the side facing away from the electric motor 9.

As can be seen best in FIGS. 4 to 6, 10 and 11, the ball bearing 12 configured according to the invention consists of an inner ring 14, several rolling elements 15 which are configured as balls and are guided in a cage 16, and an outer ring 17, 18, which can be configured differently depending on the embodiment. The outer ring 17, 18 is received in a rotationally fixed manner in a bore (not illustrated) in the housing 8 of the electromechanical power steering system, while the inner ring 14 is rotatable together with the driving worm 10. Arranged on the radially outer side of the inner ring 14 is a channel-shaped first raceway 19, in which the spherical rolling elements 15 roll. Arranged on the radially inner side of the outer ring 17, 18 is a likewise channel-shaped second raceway 20, 21, in which the spherical rolling elements 15 roll. Depending on the embodiment of the outer ring 17, 18, the second raceways 20, 21 have a different configuration.

The two raceways 20, 21 have a cross-sectional profile that varies around their circumference. The circumferential direction 22 is indicated by an arrow in FIGS. 6 and 10.

Figure 7:
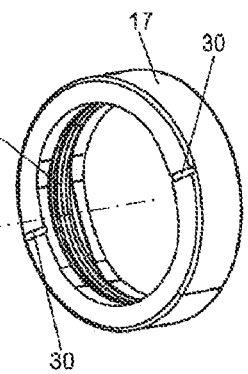
FIG. 7 is a cross-sectional detailed view on the line A-A in FIG. 6.
Figure 6:
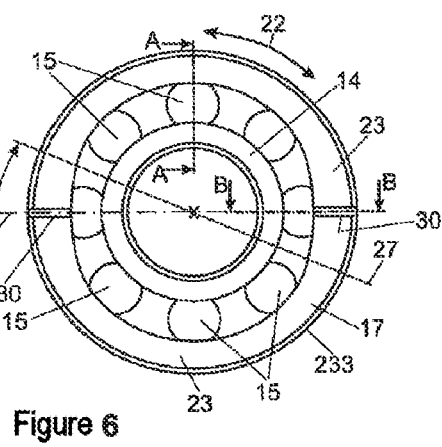
FIG. 6 is a plan view of the rolling bearing according to FIG. 4.
Figure 8:
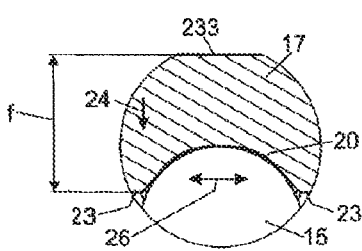
FIG. 8 is a cross-sectional detailed view on the line B-B in FIG. 6.

In the exemplary embodiment illustrated in FIGS. 4 to 8, the cross-sectional profile of the second raceway 20 is varied around its circumference, in that the extent f of its lateral flanks 23 is embodied in different manners in the radial direction 24, depending on the angle α of the circumferential direction 22 at which the cross-sectional profile is viewed. The extent f is the radial spacing between the outer face 233 and the lateral flank 23. As can be seen in FIG. 7, the extent f of the lateral flanks 23 in the radial direction 24 is smallest in two circumferential regions which are located at the very top and the very bottom in FIG. 6, i.e. the extent comprises a minimum value. Furthermore, it is apparent from FIG. 8 that the extent f of the lateral flanks 23 in the radial direction is greatest, i.e. comprises a maximum value, when the positions of the circumference which are located on the right and left in FIG. 6 are viewed. The minimum extent (minimum value of the extent) comprises a value which corresponds to about 75% of the maximum value of the extent. Since the spherical rolling elements 15 are guided only slightly by the relatively small lateral flanks 23 in the circumferential position according to FIG. 7, they can be deflected easily in the tilting direction 26. In a circumferential position according to FIG. 8, by contrast, the spherical rolling elements 15 are enclosed better by the thickly formed lateral flanks 23 and can therefore virtually no longer be displaced laterally in the tilting direction 26. As a result, tilting of the inner ring 14 about a tilting axis 27 is largely prevented, i.e. down to a minimum contingent on the elasticity of the rolling bearing material and a minimum necessary bearing play, when the tilting axis 27 is oriented at an angle α of 90° or 270° to a tilted position 28 indicated in FIG. 6. If, by contrast, the tilting axis 27 is in the tilted position 28, that is to say oriented at an angle of 0° or 180° to the tilted position 28, the inner ring 14 can be tilted to the maximum.

Figure 9:
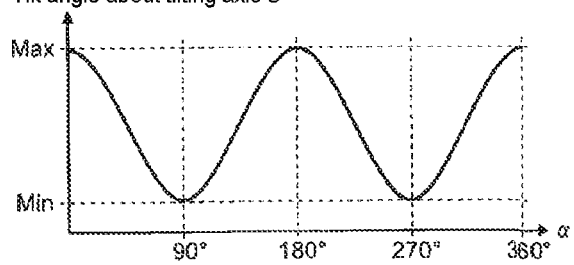
FIG. 9 is a diagram of the tilting of the inner ring of a rolling bearing depending on the angle of the tilting axis in FIG. 6.
Figure 10:
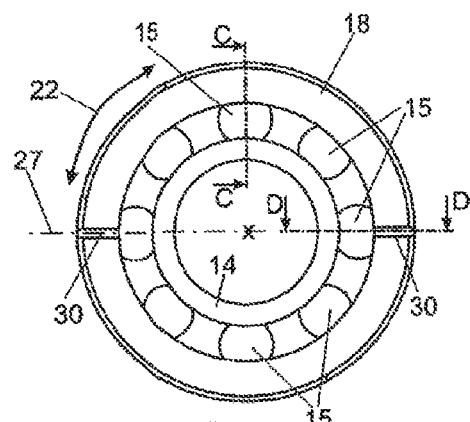
FIG. 10 is a plan view of a rolling bearing according to the present disclosure.
Figure 11:
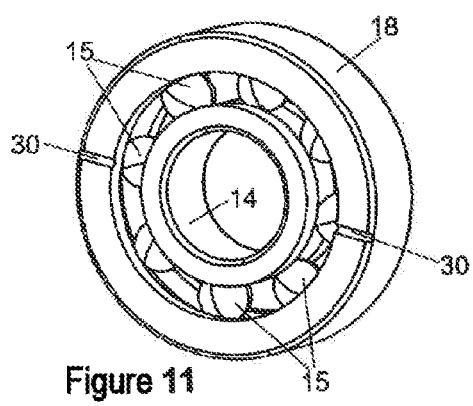
FIG. 11 is a perspective view of the rolling bearing in FIG. 10.
Figure 12:
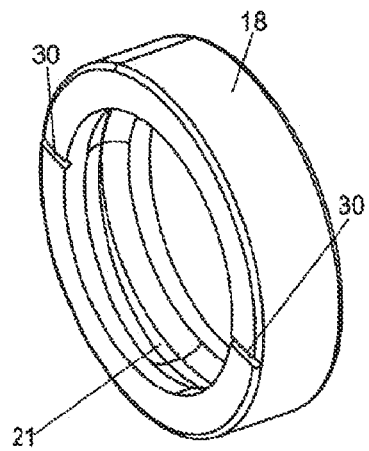
FIG. 12 is a perspective view an outer ring of the rolling bearing in FIG. 10.
Figure 13:
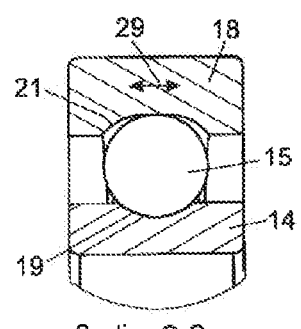
FIG. 13 is a cross-sectional detailed view on the line C-C in FIG. 10.
Figure 14:
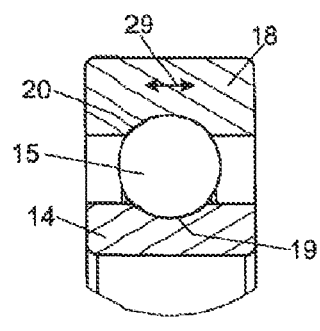
FIG. 14 is a cross-sectional detailed view on the line D-D in FIG. 10.

The course of the possible tilting about the tilting axis 27 between a maximum and a minimum depending on the orientation of the tilting axis 27 in the circumferential direction 22 starting from the tilted position 28 is illustrated in the diagram in FIG. 9. It is apparent therefrom that the cross-sectional profile of the outer ring 17 in the circumferential direction 22 is varied such that, depending on the angle α between the tilting axis 27 and a tilted position 28, a sinusoidal profile of the possible tilt angle between a maximum value and a minimum value results.

A second exemplary embodiment of the invention is illustrated in FIGS. 11 to 14. In this case, a second raceway 21 of the outer ring 18 is configured such that the lateral extent, in the direction 29 indicated in FIGS. 13 and 14, of an osculation of the second raceway 21 is varied in the circumferential direction 22 indicated in FIG. 10. The osculation of the second raceway 21 is thus wider in the position shown in FIG. 13 than in the position shown in FIG. 14. This means that the spherical rolling elements 15 are deflectable to a maximum extent in the direction 29 in the position shown in FIG. 13, said position being located at the very top and the very bottom in FIG. 10, with the result that the inner ring 14 is tiltable to a maximum extent about a tilting axis 27 oriented horizontally in FIG. 10. If, by contrast, the tilting axis 27 is rotated through 90° in the circumferential direction 22, the inner ring 14 would be tiltable only through a minimum angle limited by the elasticity of the materials of the rolling bearing 12 and a minimum necessary bearing play, because the second raceway 21, in the position shown in FIG. 14, does not allow any leeway for displacement of the spherical rolling elements 15 in the direction 29.

With regard to the course of the variation in the lateral extent of the osculation of the second raceway 21, the information given in connection with the first exemplary embodiment illustrated in FIGS. 4 to 9 applies in a corresponding manner, in particular as regards the sinusoidal profile of the tilt angle depending on the orientation of the tilting axis 27 with respect to a tilted position 28.

In both embodiments, the respective outer rings 17, 18 are provided with a marking 30 of a circumferential position that indicates the orientation of the tilting axis 27 in the tilted position 28. Specifically, the marking 30 is applied at two points at which the tilting axis 27 encloses an angle α of 0° and 180°, respectively, with the tilted position 28. The markings 30 are configured as indentations in the material of the outer ring 17, 18, but can also be embodied as protrusions or colored markings.

With the aid of the markings 30, it is possible, when constructing the device, to align the orientation of the rolling bearing 12 such that the driving worm 10 can tilt or bend in the direction of the worm wheel 11 and away from the latter (i.e. radially with respect to the axis of rotation of the worm wheel 11), while tilting or bending transversely thereto (i.e. axially with respect to the axis of rotation of the worm wheel 11) is prevented. The rolling bearing 12 according to the invention that is oriented in this way therefore allows tilting of the inner ring 14 about a defined tilting axis 27 in order to allow tilting of the driving worm 10 under high load, but prevents tilting about a tilting axis 27 oriented transversely to the tilted position 28.

LIST OF REFERENCE SIGNS

1 Steering shaft
2 Steering wheel
3 Steering gear
4 Gearwheel
5 Rack
6 Track rod
7 Vehicle wheel
8 Housing
9 Electric motor
10 Driving worm
11 Worm wheel
12 Ball bearing/rolling bearing
13 Ball bearing
14 Inner ring
15 Rolling element
16 Cage
17 Outer ring
18 Outer ring
19 First raceway
20 Second raceway
21 Second raceway
22 Circumferential direction
23 Lateral flanks
24 Radial direction
25 Angle
26 Tilting direction
27 Tilting axis
28 Tilted position
29 Direction
30 Marking

What is claimed is:

1. A rolling bearing for mounting a driving worm of an electromechanical power-assisted steering system of a motor vehicle, having
   an inner ring,
   an outer ring, and
   rolling elements arranged between the inner ring and outer ring, the rolling elements guided by a channel-shaped first raceway arranged on a radially outer side of the inner ring and by a channel-shaped second raceway arranged on a radially inner side of the outer ring, wherein the second raceway comprises a cross-sectional profile that varies sinusoidally around its circumference,
   wherein a lateral extent of an osculation of the second raceway varies around the circumference.

2. A rolling bearing for mounting a driving worm of an electromechanical power-assisted steering system of a motor vehicle, having
   an inner ring,
   an outer ring, and
   rolling elements arranged between the inner ring and outer ring, the rolling elements guided by a channel-shaped first raceway arranged on a radially outer side of the inner ring and by a channel-shaped second raceway arranged on a radially inner side of the outer ring, wherein the second raceway comprises a cross-sectional profile that varies around its circumference,
   wherein a lateral extent of an osculation of the second raceway varies around the circumference,
   wherein the second raceway includes lateral flanks and a radial extent of the lateral flanks is varied around the circumference.

3. The rolling bearing of claim 1, wherein the rolling element is in the form of a ball.

4. The rolling bearing of claim 1, wherein the rolling element is guided in a cage.

5. The rolling bearing of claim 1, wherein the outer ring is provided with a marking of a circumferential position that indicates an orientation of a tilted position of a tilting axis.

6. The rolling bearing of claim 5, wherein the marking is configured as a protrusion or indentation in the material of the outer ring.

7. A rolling bearing for mounting a driving worm of an electromechanical power-assisted steering system of a motor vehicle, having
an inner ring,
an outer ring, and
rolling elements arranged between the inner ring and outer ring, the rolling elements guided by a channel-shaped first raceway arranged on a radially outer side of the inner ring and by a channel-shaped second raceway arranged on a radially inner side of the outer ring, wherein the second raceway comprises a cross-sectional profile that varies around its circumference,
wherein the second raceway includes lateral flanks and a radial extent of the lateral flanks is varied around the circumference.

8. The rolling bearing of claim 7 wherein the cross-sectional profile varies sinusoidally around the circumference of the second raceway.

9. The rolling bearing of claim 7 wherein the rolling element is in the form of a ball.

10. The rolling bearing of claim 7 wherein the rolling element is guided in a cage.

11. The rolling bearing of claim 7 wherein the outer ring is provided with a marking of a circumferential position that indicates an orientation of a tilted position of a tilting axis.

12. The rolling bearing of claim 11 wherein the marking is configured as a protrusion or indentation in the material of the outer ring.

13. The rolling bearing of claim 7 wherein the radial extent comprises two minimum values and two maximum values, wherein the two minimum values are diametrically opposite one another and the two maximum values are diametrically opposite one another along the circumference of the outer ring.

14. The rolling bearing of claim 7 wherein a first minimum value of the radial extent is offset 90 degrees along the circumference of the outer ring from a first maximum value of the radial extent.

15. The rolling bearing of claim 14 wherein the first minimum value of the radial extent is 0.5 to 0.9 times the first maximum value of the radial extent.

16. The rolling bearing of claim 14 wherein the first minimum value of the radial extent is 0.7 to 0.8 times the first maximum value of the radial extent.

17. The rolling bearing of claim 7 wherein the outer ring is comprised of 100Cr6.

* * * * *